United States Patent [19]

Furuya et al.

[11] Patent Number: 5,263,737
[45] Date of Patent: Nov. 23, 1993

[54] DEVICE FOR STABILIZING THE ATTITUDE OF AN AUTOMOBILE

[75] Inventors: Kunitaka Furuya, Saitama; Kazuo Matsuura, Tochigi, both of Japan

[73] Assignee: Honda Giken Kabushiki Kaisha, Tokyo, Japan

[21] Appl. No.: 814,052

[22] Filed: Dec. 26, 1991

Related U.S. Application Data

[63] Continuation of Ser. No. 641,630, Jan. 17, 1991, abandoned, which is a continuation of Ser. No. 399,128, Aug. 28, 1989, abandoned.

[30] Foreign Application Priority Data

Aug. 29, 1988 [JP] Japan ................................ 63-214652

[51] Int. Cl.$^5$ .......................................... B60G 17/015
[52] U.S. Cl. .................................. 280/707; 280/714
[58] Field of Search ..................... 280/112.2, 707, 714, 280/DIG. 1, 772, 689, 840, 6.12; 364/424.05

[56] References Cited

U.S. PATENT DOCUMENTS

| | | | |
|---|---|---|---|
| 2,818,273 | 12/1957 | Weihsman | 280/702 |
| 3,181,877 | 5/1965 | McHenry | 280/DIG. 1 |
| 3,380,748 | 4/1968 | Martin | 280/709 |
| 3,752,497 | 8/1973 | Enke et al. | 280/112.2 |
| 3,945,664 | 3/1976 | Hiruma | 280/708 |
| 4,295,660 | 12/1981 | Toti et al. | 280/714 |
| 4,625,992 | 12/1986 | Tanaka et al. | 280/703 |
| 4,693,493 | 9/1987 | Ikemoto | 280/772 |
| 4,805,923 | 2/1989 | Soltis | 280/707 |
| 4,821,188 | 4/1989 | Ikemoto | 280/707 |
| 4,826,141 | 5/1989 | Buma | 280/707 |
| 4,846,496 | 7/1989 | Tanaka et al. | 280/707 |
| 4,865,148 | 9/1989 | Murumoto | 280/714 |

FOREIGN PATENT DOCUMENTS

| | | | |
|---|---|---|---|
| 3427508 | 2/1986 | Fed. Rep. of Germany | 280/714 |
| 1006945 | 4/1952 | France | 280/112.2 |
| 58760 | 4/1954 | France | 280/112.2 |
| 1301331 | 7/1962 | France | 280/702 |
| 50-103025 | 8/1975 | Japan. | |
| 61-64513 | 4/1986 | Japan | 280/707 |

*Primary Examiner*—Karin L. Tyson

[57] ABSTRACT

A device for stabilizing the attitude of an automobile having an automobile body and lefthand and right-hand road wheels which are rotatably supported on the automobile body, includes cylinder means independently disposed between the road wheels and the automobile body and having respective fluid chambers, the cylinder means being operable depending on fluid pressures in the fluid chambers, a communication pipe mechanism connectable for bringing the fluid chambers of the cylinder means into fluid communication with each other, valve means disposed in the communication pipe mechanism, for pressurizing a fluid in the communication pipe mechanism and controlling the direction of flow of the fluid in the communication pipe mechanism, detecting means including at least an automobile speed sensor for detecting the speed of travel of the automobile and a steering reactive force sensor for detecting a steering reactive force, and control means responsive to detected signals from the detecting means responsive to detected signals from the detecting means for controlling the valve means to transfer the fluid from the fluid chambers of the cylinder means which are located on a radially inner side of a turning circle when the automobile makes a turn into the fluid chambers of the cylinder means which are located on a radially outer side of the turning circle, thereby to stabilize the attitude of the automobile.

7 Claims, 6 Drawing Sheets

DEVICE FOR STABILIZING THE ATTITUDE OF AN AUTOMOBILE

This application is a continuation of application Ser. No. 07/641,630 filed Jan. 17, 1991, now abandoned, which is a continuation of application Ser. No. 07/399,128 filed Aug. 28, 1989, now abandoned.

BACKGROUND OF THE INVENTION

1. Field of the Invention

The present invention relates to a device for stabilizing the attitude of an automobile, and more particularly to an automobile attitude stabilizer for stabilizing the attitude of an automobile through quick determination of an automobile behavior such as a turn based on an automobile speed, a resistance to the steering action from the road, etc.

2. Prior Art

It is known that when an automobile makes a turn, the automobile body rolls and its turning stability is lowered by such rolling. Various automobile attitude stabilizers for stabilizing the attitude of an automobile during a turn have been developed. One such automobile attitude stabilizer is disclosed in Japanese Laid-Open Patent Publication No. 50-103025. Recently, there has also been proposed an electronically controlled automobile attitude stabilizer for controlling a change in the attitude of an automobile during a turn thereof by detecting a condition under which the automobile turns.

The electronically controlled automobile attitude stabilizer operates generally by detecting either the automobile speed and steering angle or the automobile speed and the lateral acceleration to determine a turning condition under which the automobile turns, and increasing the damping force of the shock absorber of a suspension depending on the turning condition, thus limiting a change in the automobile attitude.

As described above, the electronically controlled automobile attitude stabilizer determines the automobile turning condition by detecting either the automobile speed and steering angle or the automobile speed and lateral acceleration. Therefore, since the automobile turning condition can be determined only after the automobile has started to turn, the automobile attitude stabilizer has a poor control response.

SUMMARY OF THE INVENTION

In view of the aforesaid problem of the conventional electronically controlled automobile attitude stabilizer, it is an object of the present invention to provide a device for stabilizing the attitude of an automobile with a high control response.

According to the present invention, there is provided a device for stabilizing the attitude of an automobile having an automobile body and lefthand and right-hand road wheels which are rotatably supported on the automobile body, the device comprising fluid pressure activating means comprising, for example, cylinder means independently disposed between the road wheels and the automobile body and having respective fluid chambers, the cylinder means being operable depending on fluid pressures in the fluid chambers, a communication pipe mechanism connectable for bringing the fluid chambers of the cylinder means into fluid communication with each other, valve means disposed in the communication pipe mechanism, for pressurizing a fluid in the communication pipe mechanism and controlling the direction of flow of the fluid in the communication pipe mechanism, detecting means including at least an automobile speed sensor for detecting the speed of travel of the automobile and a steering reactive force sensor for detecting a steering reactive force, and control means responsive to detected signals from the detecting means for controlling the valve means to transfer the fluid from the fluid chambers of the cylinder means which are located on a radially inner side of a turning circle when the automobile makes a turn into the fluid chambers of the cylinder means which are located on a radially outer side of the turning circle, thereby to stabilize the attitude of the automobile.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
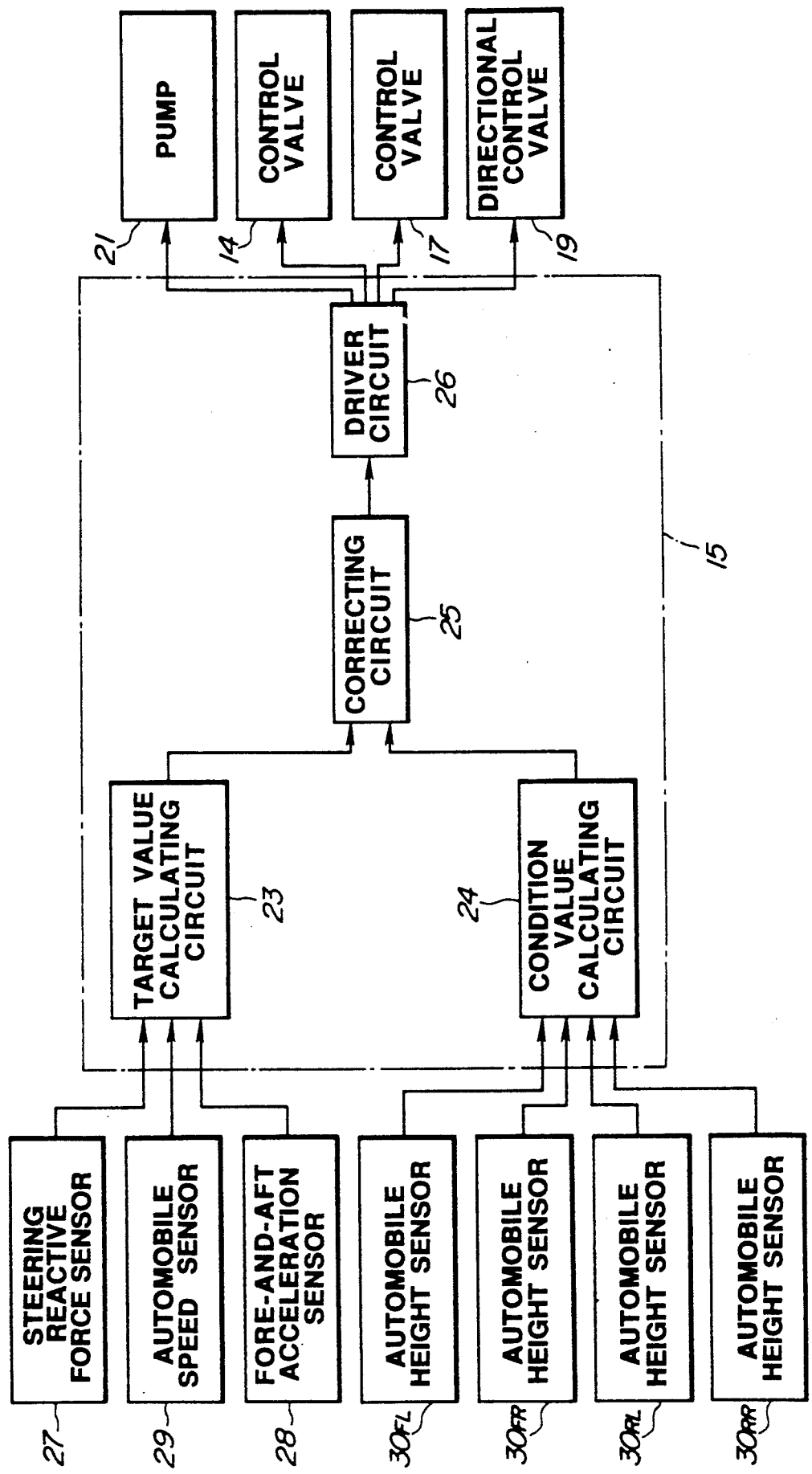
FIG. 1 is a block diagram of a control system of an automobile attitude stabilizer according to a preferred embodiment of the present invention.
Figure 2:
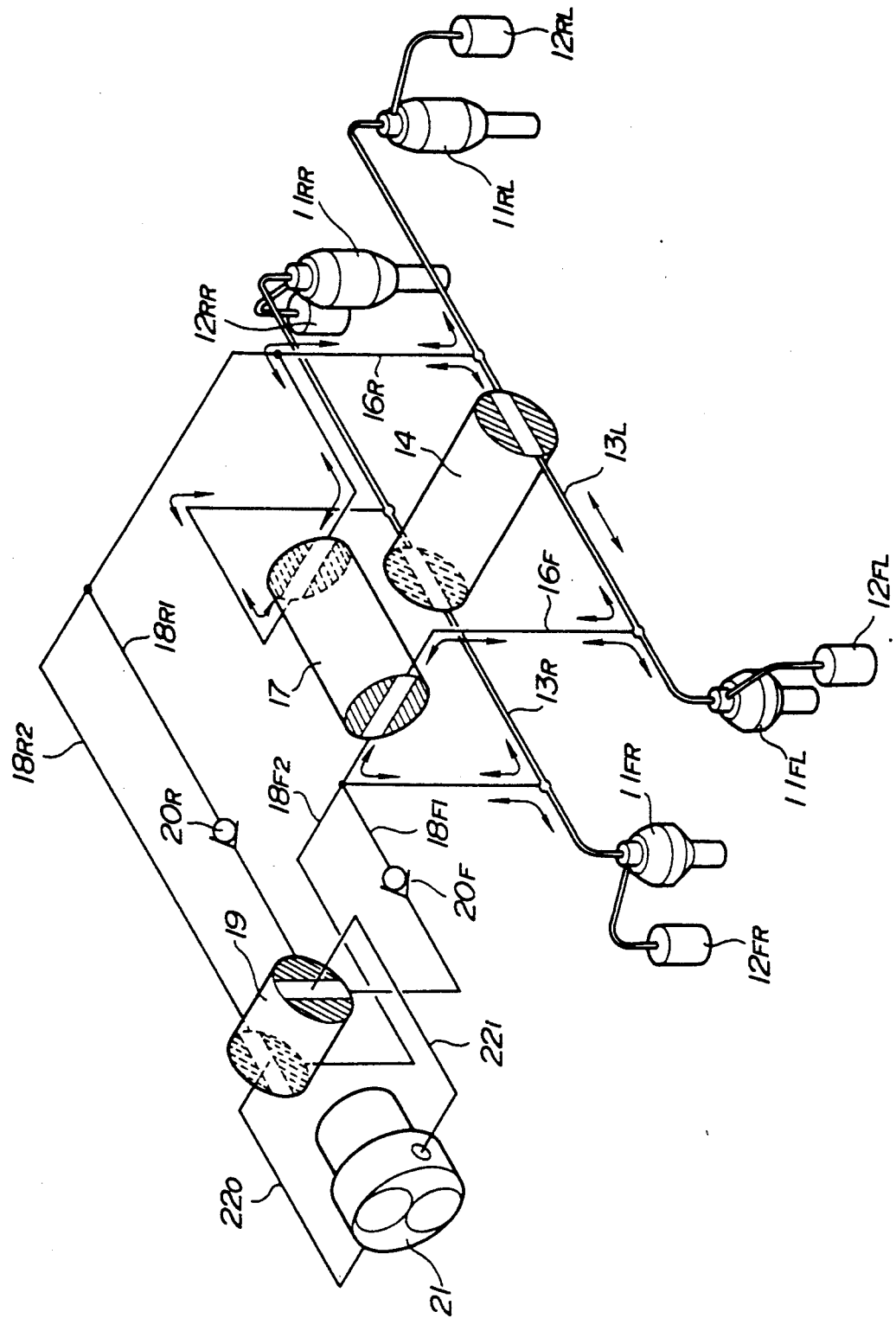
FIG. 2 is a schematic perspective view of a fluid control system of the automobile attitude stabilizer, showing the parts position when the automobile runs normally, e.g., it runs straight ahead.

FIGS. 2 through 6 schematically show various components of the fluid control system of an automobile attitude stabilizer for use on an automobile according to a preferred embodiment of the present invention. The body and road wheels rotatably supported thereon, which will be referred below, of the automobile are omitted from illustration in FIGS. 2 through 6.

The fluid control system includes left and right fluid pressure activating means comprising, for example a damper 11FL disposed between the front left road wheel and the automobile body, a damper 11FR disposed between the front right road wheel and the automobile body, a damper 11RL disposed between the rear left road wheel and the automobile body, and a damper 11RR disposed between the rear right road wheel and the automobile body. These dampers 11FL, 11FR, 11RL, 11RR are in the form of fluid cylinders associated respectively with accumulators 12FL, 12FR, 12RL, 12RR, and have respective fluid chambers communicating with the corresponding accumulators 12FL, 12FR, 12RL, 12RR. The dampers 11FL, 11FR, 11RL, 11RR are extended depending on the fluid pressures developed in the fluid chambers thereof for thereby adjusting or varying the relative height between the respective road wheels and the automobile body. Stated otherwise, these dampers actively interconnect the road wheels and the automobile body depending on the fluid pressures in their fluid chambers.

The fluid chambers of the lefthand dampers 11FL, 11RL are interconnected or held in fluid communication with each other through a fore-and-aft communication pipe 13L. Likewise, the fluid chamber of the righthand dampers 11FR, 11RR are interconnected or held in fluid communication with each other through a fore-and-aft communication pipe 13R. The fore-and-aft communication pipes 13L, 13R extend through a first common solenoid-operated control valve 14 with its solenoid electrically connected to a controller 15 (described later on). Therefore, the solenoid-operated control valve 14 is controlled by the controller 15 to selectively open and close the fore-and-aft communication pipes 13L, 13R. More specifically, the control valve 14 selectively provides simultaneous fluid communication between the dampers connected to the opposite ends of the fore-and-aft communication pipes 13L, 13R.

Portions of the fore-and-aft communication pipes 13L, 13R, which lie on the opposite sides of the control valve 14, are interconnected or held in fluid communication with each other through front and rear lateral communication pipes 16F, 16R which extend through a second common solenoid-operated control valve 17. The control valve 17 operates in the same manner as the control valve 14. The solenoid of the control valve 17 is electrically connected to the controller 15 and controlled thereby for simultaneously opening or closing the lateral communication pipes 16F, 16R.

Two control pipes 18F1, 18F2 are branched from the portion of the front lateral communication pipe 16F which extends on the righthand side of the control valve 17. Similarly, two control pipes 18R1, 18R2 are branched from the portion of the rear lateral communication pipe 16R which extends on the lefthand side of the control valve 17. These control pipes are connected to or communicates with control ports of a solenoid-operated directional control valve 19.

The control pipes 18F1, 18R1 have respective check valves 20F, 20R for preventing a fluid flow from being directed toward the directional control valve 19. In the illustrated embodiment, the control pipes 18F1, 18F2, 18R1, 18R2 and the directional control valve 19 jointly constitute a directional control mechanism for controlling the direction of flow of a fluid into the lateral communication pipes 16F, 16R or the fore-and-aft communication pipes 13L, 13R.

The directional control valve 19 has its solenoid electrically connected to the controller 15, and input and output ports connected respectively to outlet and inlet ports of a pump 21 through supply and discharge pipes 22i, 22o, respectively. The directional control valve 19 is controlled by the controller 15 for selectively connecting the supply pipe 22i to one of the control pipes 18F1, 18R1 at a time and the discharge pipe 22o to one of the control pipes 18F2, 18R2 at a time. The pump 21 is electrically connected to the controller 15 so that the operation of the pump 21 will be controlled by the controller 15.

As shown in FIG. 1, the controller 15 comprises a target value calculating circuit 23, a condition value calculating circuit 24, a correcting circuit 25, and a driver circuit 26. To the target value calculating circuit 23, there are connected a steering reactive force sensor 27, an automobile speed sensor 29, and a fore-and-aft acceleration sensor 28. Four automobile height sensors 30FL, 30FR, 30RL, 30RR located respectively at the road wheels are connected to the condition value calculating circuit 24. The target value calculating circuit 23 is supplied with detected signals from the sensors 27, 28, 29 and calculates a target roll angle and a target pitch angle based on the supplied signals. The condition value calculating circuit 24 is supplied with detected signals from the height sensors 30FL, 30FR, 30RL, 30RR and calculates an actual roll angle and an actual pitch angle based on the supplied signals. The target value calculating circuit 23 and the condition value calculating circuit 24 are coupled to the correcting circuit 25 which compares the actual roll angle with the target roll angle and also the actual pitch angle with the target pitch angle and determines control values. The driver circuit 26 is connected to the correcting circuit 25 and supplied with control signals representing the control values. The pump 21 and the valves 14; 17, 19 are connected to the driver circuit 26 and actuatable thereby based on the control signals. The target value calculating circuit 23, the condition value calculating circuit 24, and the correcting circuit 25 can be implemented by a microcomputer as can easily be understood by a person skilled in the art.

The steering reactive force sensor 27 serves to detect a resistance (steering reactive force) to the steering action from the road, and issue a detected signal which represents the detected steering reactive force. The steering reactive force sensor 27 comprises, for example, a torque sensor for detecting the torque transmitted through a steering shaft, or a sensor for detecting the displacement from a neutral position of the valve body of a four-way directional control valve which controls oil under pressure supplied to an actuator if the automobile is equipped with a hydraulically operated power steering system. The automobile speed sensor 29 serves to detect the speed of travel of the automobile and issue a detected signal indicative of the detected speed. The fore-and-aft acceleration sensor 28 serves to detect the acceleration of the automobile in its fore-and-aft direction and issue a detected signal indicating the detected acceleration. The four automobile height sensors 30RL, 30FR, 30RL, 30RR detect the relative heights between the automobile body and the road wheels, and generate detected signals representative of the detected heights.

Operation of the automobile attitude stabilizer according to the illustrated embodiment will be described below.

Detected signals from the sensors 27, 28, 29, 30FL, 30FR, 30RL, 30RR are processed by the controller 15 for controlling the valves 14, 17, 19 and the pump 21 under feedback control.

When the automobile is running straight ahead at a constant speed, the pump 21 is shut off, the fore-and-aft communication pipes 13L, 13R are opened by the control valve 14, and the lateral communication pipes 16F, 16R are opened by the control valve 17 to interconnect the fore-and-aft communication pipes 13L, 13R, thus providing fluid communication between the fluid chambers of the dampers 11FL, 11FR, 11RL, 11RR. Therefore, the fluid pressures in the fluid chambers of these dampers are substantially equalized or kept in equilibrium, so that the automobile heights at the front left, front right, rear left, and rear right road wheels are equalized.

Figure 3:
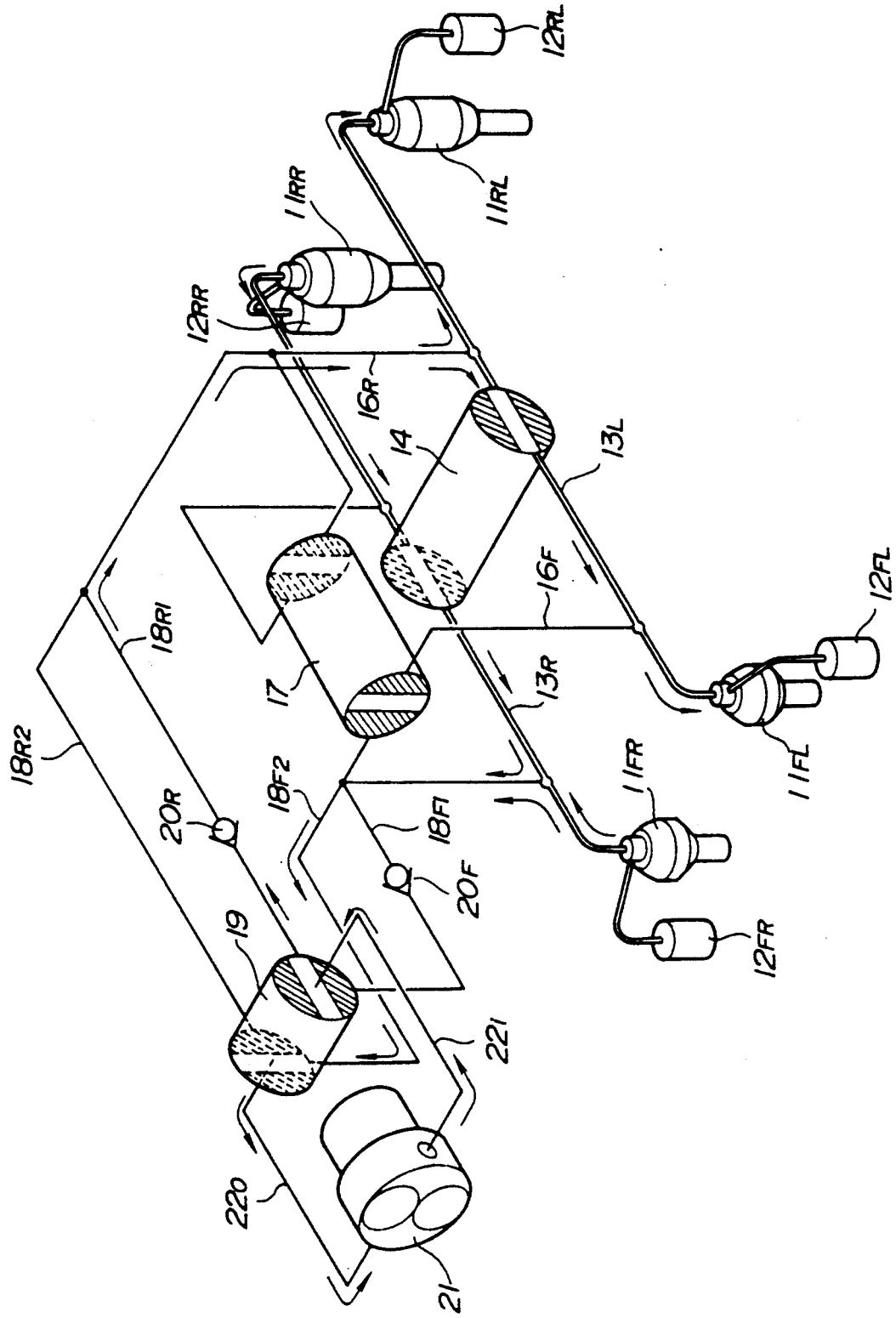
FIG. 3 is a schematic perspective view of the fluid control system, showing the parts position when the automobile turns right.

If the detected signals from the steering reactive force sensor 27 and the automobile speed sensor 29 satisfy certain conditions and indicate that the automobile is making a turn, the pump 21 is actuated, and the control valve 17 and the directional control valve 19 are operated to introduce a high-pressure fluid into the front and rear dampers which are located on a radially outer side with respect to the turning circle. More specifically, when the automobile turns right, the lateral communication pipes 16F, 16R are closed by the control valve 17 to separate the fore-and-aft communication pipes 13L, 13R fluidly from each other, as shown in FIG. 3. At the same time, the supply pipe 22i and the control pipe 18R1 are brought into mutual communication, and the discharge pipe 22o and the control pipe 18F2 are brought into mutual communication, by the directional control valve 19. Thus, the fluid is drawn from the fluid chambers of the righthand dampers 11FR, 11RR and introduced into the fluid chambers of the lefthand dampers 11FL, 11RL by the pump 21, as indicated by the arrows in FIG. 3.

Figure 4:
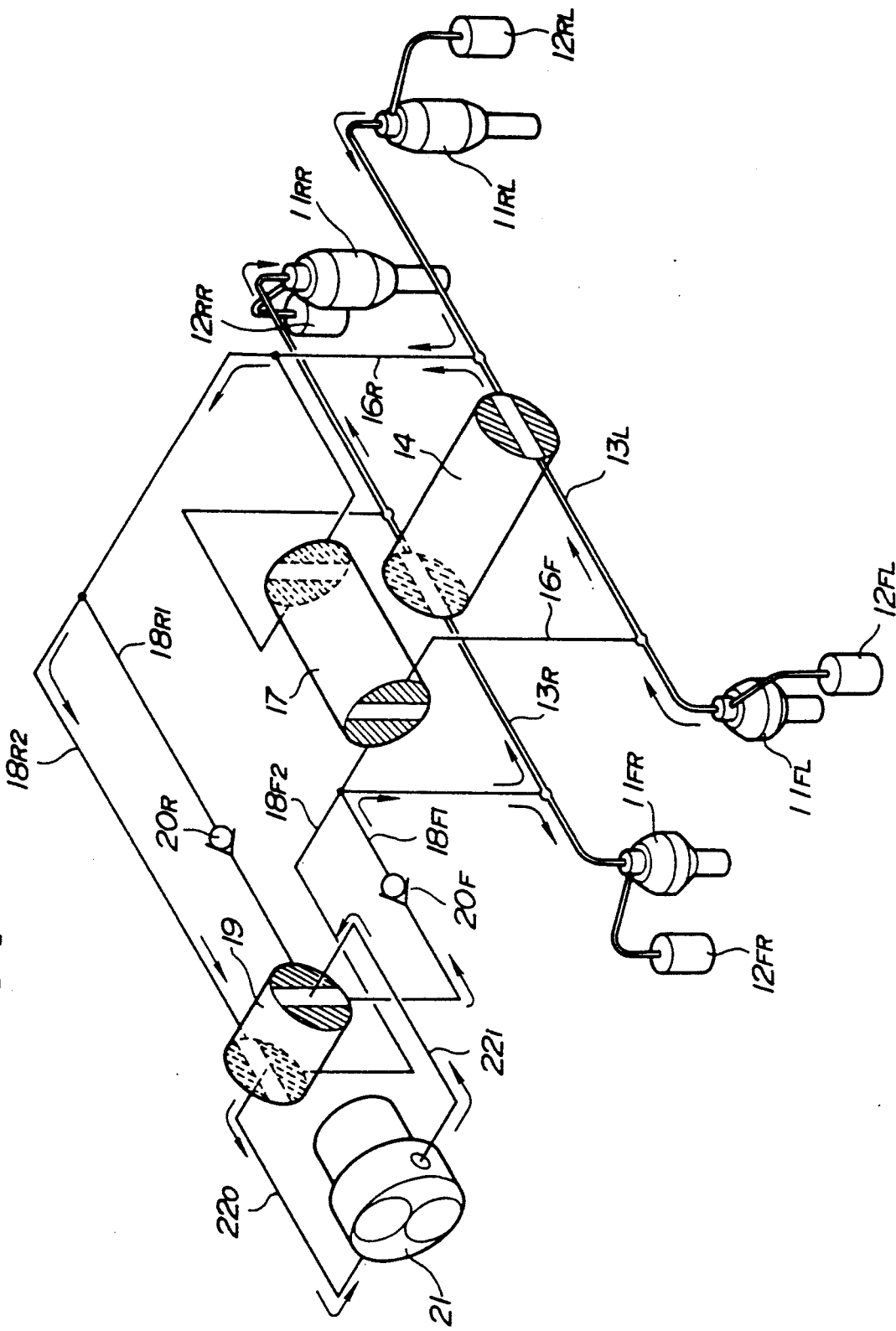
FIG. 4 is a schematic perspective view of the fluid control system, showing the parts position when the automobile turns left.

When the automobile turns left, the lateral communication pipes 16F, 16R are closed by the control valve 17, and the supply pipe 22i and the control pipe 18F1 are brought into mutual communication, and the discharge pipe 22o and the control pipe 18R2 are brought into mutual communication, by the directional control valve 19, as shown in FIG. 4. Thus, the fluid is drawn from the fluid chambers of the lefthand dampers 11FL, 11RL and introduced into the fluid chambers of the righthand dampers 11FR, 11RR by the pump 21, as indicated by the arrows in FIG. 4.

Consequently, the fluid pressure in the fluid chambers of the radially outer dampers on the turning circle are increased to limit a reduction in the automobile height on the radially outer side of the automobile, and the fluid pressure in the fluid chambers of the radially inner dampers on the turning circle are lowered to limit an increase in the automobile height on the radially inner side of the automobile, with the result that the automobile keeps a proper attitude. Since the automobile attitude stabilizer of the invention controls the automobile attitude during a turn based on the automobile speed and the steering reactive force, it can actuate the valves 14, 17, 19 and the pump 21 before the automobile starts to turn, and hence has a high control response. More specifically, when the automobile makes a turn, the steering reactive force, yaw acceleration, and lateral acceleration are not generated in phase, but the steering reactive force is produced at first. Inasmuch as the automobile attitude stabilizer of the invention controls the automobile attitude based on the steering reactive force which is generated at first, it provides a high control response.

When the automobile is decelerated or accelerated as detected by the fore-and-aft acceleration sensor 28, the pump 21 is actuated, and the control valves 14, 17 and the directional control valve 19 are operated to introduce a high-pressure fluid from the pump 21 into the fluid chambers of the front dampers 11FL, 11FR or the fluid chambers of the rear dampers 11RL, 11RR for thereby stabilizing the attitude of the automobile.

Figure 5:
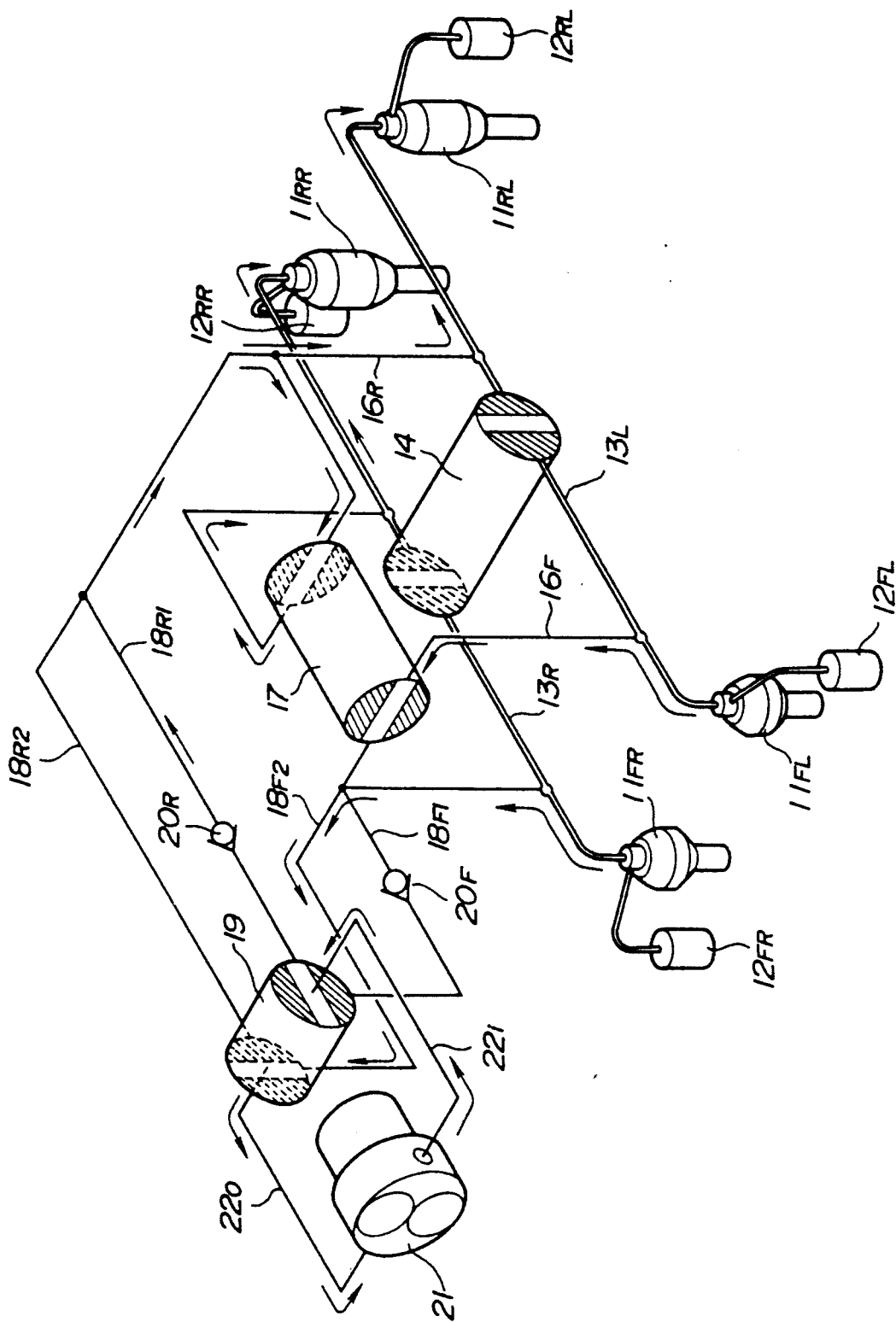
FIG. 5 is a schematic perspective view of the fluid control system, showing the parts position when the automobile is accelerated or started.

More specifically, when the automobile is accelerated or started, the fore-and-aft communication pipes 13L, 13R are closed by the control valve 14, the lateral communication pipes 16F, 16R are opened by the control valve 17, and the supply pipe 22i and the control pipe 18R1 are brought into mutual communication, and the discharge pipe 22o and the control pipe 18F2 are brought into mutual communication, by the directional control valve 19, as shown in FIG. 5. Therefore, the fluid is drawn from the fluid chambers of the front dampers 11FL, 11FR and transferred under pressure into the fluid chambers of the rear dampers 11RL, 11RR by the pump 21, as indicated by the arrows in FIG. 5.

Figure 6:
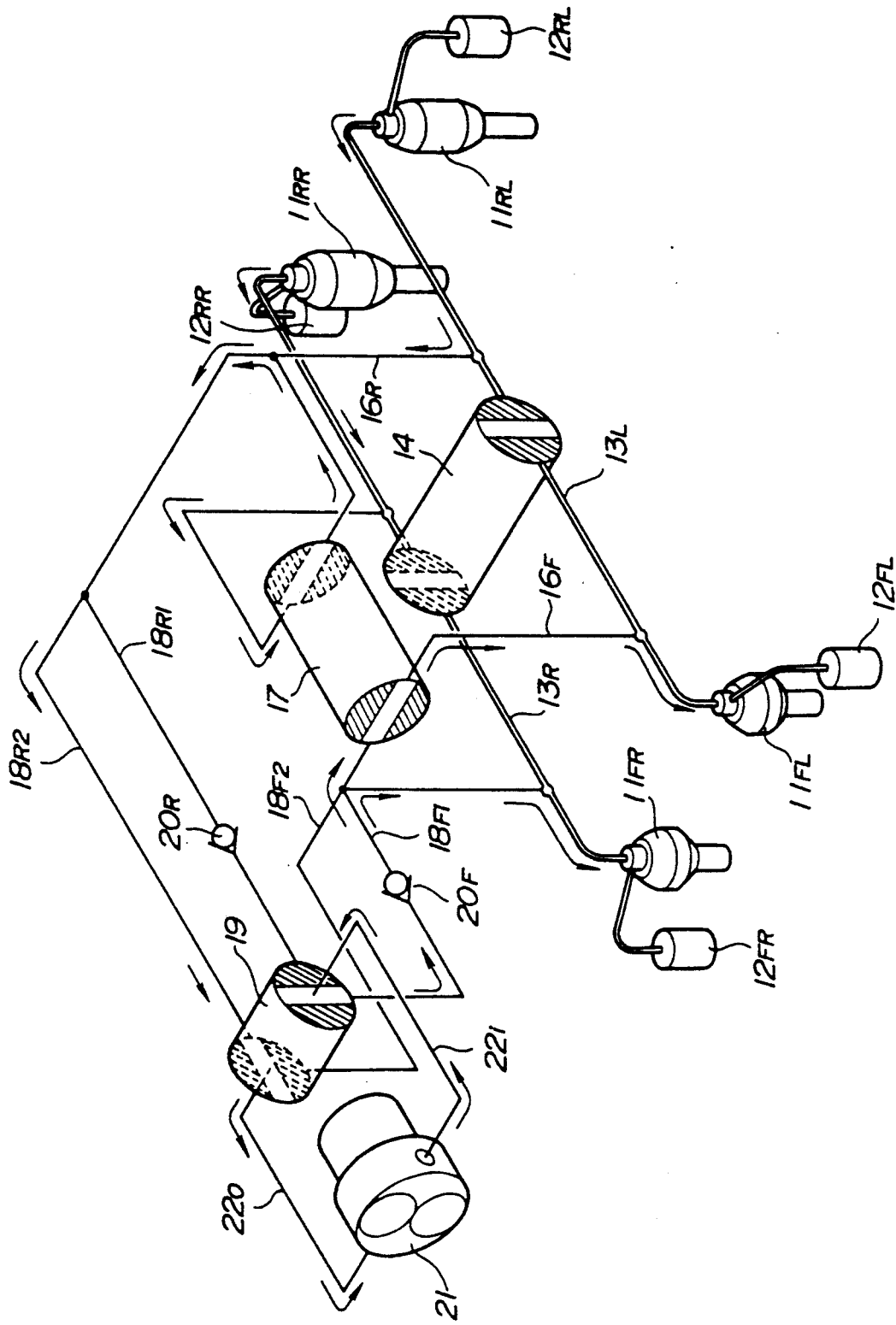
FIG. 6 is a schematic perspective view of the fluid control system, showing the parts position when the automobile is decelerated or braked.

When the automobile is decelerated or braked, the fore-and-aft communication pipes 13L, 13R are closed by the control valve 14, the lateral communication pipes 16F, 16R are opened by the control valve 17, and the supply pipe 22i and the control pipe 18F1 are brought into mutual communication, and the discharge pipe 22o and the control pipe 18R2 are brought into mutual communication, by the directional control valve 19, as shown in FIG. 6. Therefore, the fluid is drawn from the fluid chambers of the rear dampers 11RL, 11RR and transferred under pressure into the fluid chambers of the front dampers 11FL, 11FR by the pump 21, as indicated by the arrows in FIG. 6.

Therefore, upon acceleration or starting of the automobile, the fluid pressures in the fluid chambers of the rear dampers 11RL, 11RR are increased to limit a reduction in the automobile height on the rear side thereof, and the fluid pressures in the fluid chambers of the front dampers 11FL, 11FR are lowered to limit an increase in the automobile height on front side thereof. Upon deceleration or braking of the automobile, the fluid pressures in the fluid chambers of the front dampers 11FL, 11FR are increased to limit a reduction in the automobile height on the front side thereof, and the fluid pressures in the fluid chambers of the rear dampers 11RL, 11RR are lowered to limit an increase in the automobile height on rear side thereof. Accordingly, the automobile can maintain a proper attitude when it is accelerated or decelerated.

With the present invention, as described above, the automobile attitude stabilizer has a high control response since it stabilizes the automobile attitude by controlling the same during a turn based on the automobile speed and steering reactive or resistive force. The attitude of the automobile when it is accelerated or decelerated, or started or braked, can also be stabilized by being controlled on the basis of the acceleration or deceleration, or starting or braking, as detected by the fore-and-aft acceleration sensor.

Although there has been described what is at present considered to be the preferred embodiment of the present invention, it will be understood that the invention may be embodied in other specific forms without departing from the essential characteristics thereof. The present embodiment is therefore to be considered in all aspect as illustrative, and not restrictive. The scope of the invention is indicated by the appended claims rather than by the foregoing description.

We claim:

1. A device for stabilizing the attitude of an automobile having an automobile body and front left, front right, rear left and rear right road wheels which are rotatably supported on the automobile body, said device comprising:

cylinder means independently disposed between the road wheels and the automobile body and having respective fluid chambers, said cylinder means including front left and rear left cylinder means independently disposed between the front left and rear left road wheels and the automobile body, and front right and rear right cylinder means independently disposed between the front right and rear right road wheels and the automobile body, said cylinder means being operable depending on fluid pressures in the fluid chambers for adjusting the relative height between respective road wheels and the automobile body;

a communication pipe mechanism connecting said respective fluid chambers through a closed fluid circuit for bringing said respective fluid chambers of said cylinder means into direct fluid communication with each other, said communication pipe mechanism including a lefthand fore-and-aft communication pipe for providing fluid communication between said front left and rear left cylinder means, and a righthand fore-and-aft communication pipe for providing fluid communication between said front right and rear right cylinder means;

valve means disposed in said communication pipe mechanism, for pressurizing a fluid in said communication pipe mechanism and controlling the direction of flow of said fluid in the communication pipe mechanism, wherein said valve means comprises at least one control valve which is selectively openable and closable to allow a shut off of a flow of the fluid through said lefthand and righthand fore-and-aft communication pipes;

detecting means including at least an automobile speed sensor for detecting the speed to travel of the automobile and a steering reactive force sensor for detecting a steering reactive force, said detecting means further including a fore-and-aft acceleration sensor for detecting when the automobile is accelerated and decelerated or started and braked; and control means response to detected signals from said detecting means for controlling said valve means to transfer, through said lefthand and right hand fore-and-aft communication pipes, the fluid from the fluid chambers of the front and rear cylinder means which are located on the radially inner side of the turning circle directly into the fluid chambers of the front and rear cylinder means which are located on the radially outer side of the turning circle, said control means comprising means, responsive to a detected signal from said fore-and-aft acceleration sensor indicating that the automobile is accelerated or started, for controlling said valve means to close said control valve and to transfer said fluid through said communication pipe mechanism, from the fluid chambers of the two front cylinder means into the fluid chambers of the two rear cylinder means, thereby to stabilize the attitude of the automobile.

2. A device according to claim 1, wherein said control means comprises means, responsive to a detected signal from said fore-and-aft acceleration sensor indicating that the automobile is decelerated or braked, for controlling said valve means to close said control valve to transfer, through said communication pipe mechanism, from the fluid chambers of the two rear cylinder means into the fluid chambers of the two front cylinder means.

3. A device according to the claim 2, wherein said detecting means further comprises an automobile height sensor for detecting the height of the automobile;

said control means comprising target value calculating means for calculating a control target value to stabilize the attitude of the automobile based on detected signals from said automobile speed sensor, said steering reactive sensor, and said fore-and-aft acceleration sensor, condition valve calculating means for calculating an automobile height based on a detected signal from said automobile height based on a detected signal from said automobile height sensor, correcting means for comparing the automobile height from said condition value calculating means with said control target value from said target value calculating means and for correcting said control target value to determine a target value, and driver means for controlling said value means based on said target value determined by said controlling means.

4. A device for stabilizing the attitude of an automobile having an automobile body and front left, front right, rear left and rear right road wheels which are rotatably supported on the automobile body, said device comprising:

left and right fluid pressure activating means independently disposed between the road wheels and the automobile body, for actively interconnecting the automobile body and the road wheels depending on the pressure of the a fluid, and for adjusting a height between respective road wheels and the automobile body;

a communication pipe mechanism connecting said left and right fluid pressure activating means through a closed fluid circuit for bringing the left and right fluid pressure activating means into direct fluid communication with each other, said communication pipe mechanism including a lefthand fore-and-aft communication pipe for providing fluid communication between said front left and rear left fluid pressure activating means, and a righthand fore-and-aft communication pipe for providing fluid communication between said front right and rear right fluid pressure activating means, wherein said communication pipe mechanism further includes front and rear lateral communication pipes for providing fluid communication between said lefthand and righthand and fore-and-aft communication pipes;

an operating mechanism disposed in said communication pipe mechanism and comprising pump means for pressurizing the fluid in said communication pipe mechanism and direction control means for controlling the direction of flow of said fluid between and left and right fluid pressure activating means, said operating mechanism including first control valve means disposed in said lefthand and righthand fore-and-aft communication pipes and selectively openable and closable for allowing and cutting off fluid communication through said lefthand and righthand fore-and-aft communication pipes, and second control valve means disposed in said front and rear lateral communication pipes and selectively openable and closable for allowing and cutting off fluid communication through said lateral communication pipes;

detecting means including at least an automobile speed sensor for detecting the speed of travel of the automobile and a steering reactive force sensor for detecting a steering reactive force; and control means responsive to detected signals from said detecting means for controlling said valve means to transfer, through said lefthand and righthand fore-and-aft communication pipes, the fluid from the front and rear fluid pressure activating means which are located on the radially inner side of the turning circle directly into the front and rear fluid pressure activating means which are located on the radially outer side of the turning circle, said control means comprising means, responsive to detected signals from said detecting means indicating that the automobile is running straight ahead, for opening said first and second control valve means to being all of said fluid pressure activating means into equilibrium and thereby stabilize the attitude of the automobile.

5. A device according to claim 4, wherein said control means comprises means, responsive to detective signals from said detecting means indicating that the automobile is making a turn, for controlling said operating mechanism to open said first control valve means, close said second control valve means and switch said directional control valve to transfer, through said communication pipes mechanism, from the fore-and-aft communication pipe which is located on the radially inner side of the turning circle into the fore-and-aft communication pipe which is located on the radially outer side of the turning circle.

6. A device according to claim 4, wherein said control means comprises means, responsive to detected signal from said detecting means indicating that the automobile is accelerated or started, for controlling said operating mechanism to close said first control valve means, open said second control valve means, and switch said directional control means to transfer, through said communication pipe mechanism, from the front lateral communication pipe into the rear lateral communication pipe.

7. A device according to claim 4, wherein said control means comprises means, responsive to detected signals from said detecting means indicating that the automobile is decelerated or braked, for controlling said operating mechanism to close said first control valve means, open said second control valve means, and switch said directional control means to transfer, through said communication pipe mechanism, from the rear lateral communication pipe into the front lateral communication pipe.

* * * * *